July 2, 1935.  D. E. CHAMBERS ET AL  2,006,984
THEATER LIGHT CONTROL
Filed Oct. 25, 1934
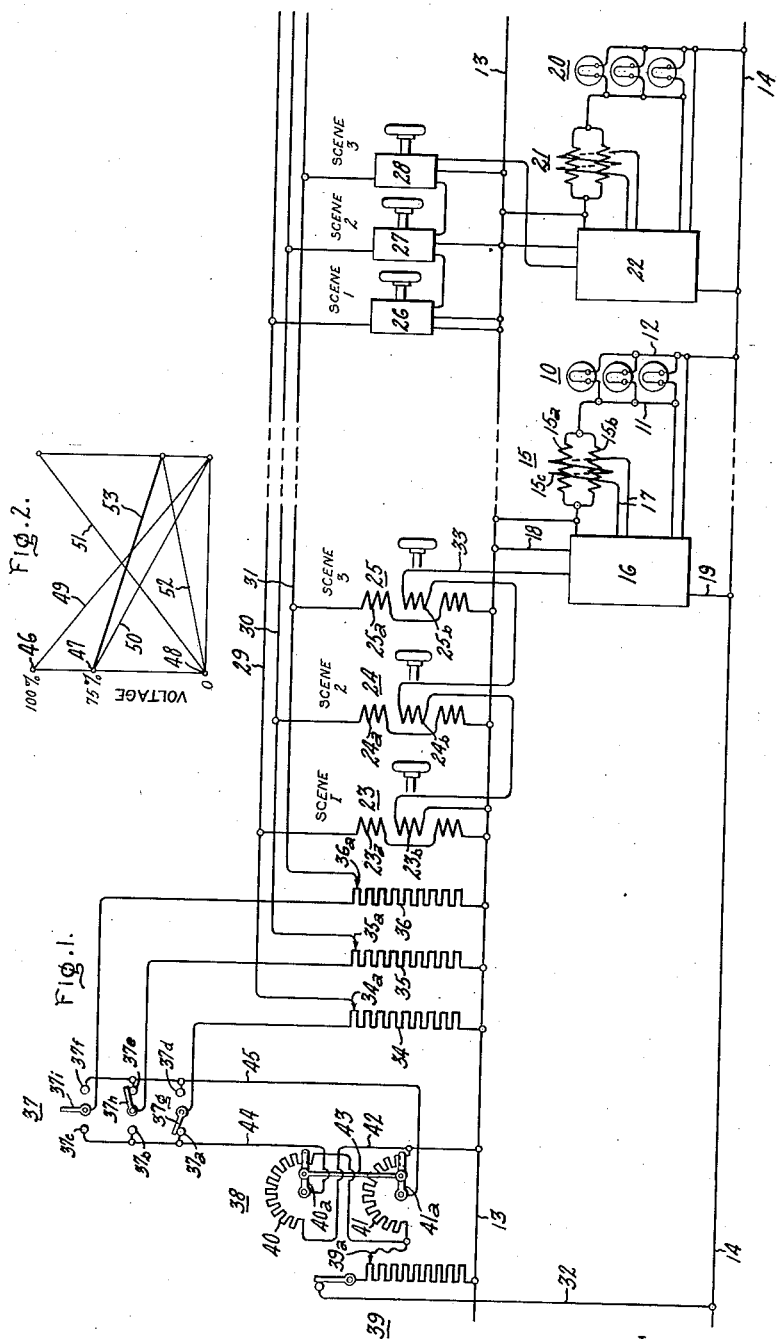
Inventors:
Dudley E. Chambers,
Elbert D. Schneider,
by Harry E. Dunham
Their Attorney.

Patented July 2, 1935

2,006,984

UNITED STATES PATENT OFFICE 2,006,984

THEATER LIGHT CONTROL

Dudley E. Chambers and Elbert D. Schneider, Schenectady, N. Y., assignors to General Electric Company, a corporation of New York Application October 25, 1934, Serial No. 749,964

9 Claims. (Cl. 175—312)

This invention relates to control systems, more particularly to systems in which means are provided for presetting a plurality of operating values of an electrical condition of a controlled circuit and effecting a gradual linear transition from one preset value to another, and it has for an object the provision of a simple, reliable and improved system of this character.

Another object of this invention is the provision of a control system of this character utilizing a minimum of apparatus and control circuits.

One example of a control system of the character referred to is a modern illumination control system for theatre dimming apparatus and the like in which means are provided for presetting a plurality of lighting scenes in advance of the actual performance, together with means for effecting a gradual transition or "fading" of one preset scene into another. A more specific object of this invention is the provision of a system of this character in which the desired gradual linear scene fading is accomplished with less apparatus and fewer control circuits than have been required heretofore. In this particular aspect, the invention is an improvement of the illumination control system disclosed in application, Serial No. 654,075, Harold B. LaRoque, filed January 28, 1933, and assigned to the assignee of the present invention.

In carrying the invention into effect in one form thereof, a plurality of regulating devices, each having a pair of inductively related windings, are provided for presetting a plurality of operating values of an electrical condition of a controlled device or circuit. Corresponding windings of these regulators are connected in series relationship with each other to the controlled device or circuit and other corresponding windings of these regulators are connected to a voltage supply source. In addition, means are provided for oppositely varying the voltage supplied to said regulators between predetermined values thereby to effect the desired linear transition between one preset value and another.

In illustrating the invention in one form thereof it is shown as embodied in an illumination control system for theatre dimming apparatus and the like.

For a better and more complete understanding of the invention, reference should now be had to the following specification and to the accompanying drawing, in which Fig. 1 is a simple diagrammatical illustration of an embodiment of the invention and Fig. 2 is a chart of characteristic curves which serve to explain the fading operation.

Referring now to the drawing, a device or circuit, such for example as represented by the plurality of lamps 10 and the conductors 11 and 12, is connected to a suitable source of alternating voltage represented by the two supply lines 13 and 14. Suitable means, illustrated as a saturable core type reactor 15, are provided for controlling the voltage supplied to the lamps 10 and the intensity of illumination thereof. The alternating current or reactive windings 15a and 15b of the reactor are connected in series relationship with the lamp circuit to the source 13, 14. For the sake of simplicity, the reactor is illustrated conventionally with the usual core member omitted. For the purpose of varying the saturation of the reactor and the voltage drop across the alternating current windings, the reactor is provided with a direct current control winding 15c which is supplied with direct current of variable magnitude from suitable means conventionally illustrated as electric valve apparatus 16 to the output circuit of which the winding 15c is connected by means of conductors 17.

Any variation in the magnitude of the current flowing in the control winding 15c effects a corresponding change in the saturation of the reactor 15 and likewise in the reactive voltage drop across the reactance windings 15a and 15b. Since the voltage of the source 13, 14 remains substantially constant, the variation in the reactive voltage drop across the windings 15a and 15b effects a corresponding variation in the voltage applied to the lamps 10 and consequently in the intensity of illumination thereof. Thus it will be seen that a variation in current flowing in the control winding 15c effects a corresponding change in the voltage supplied to the lamps 10. An increase in the current of the control winding effects a decrease in the reactive voltage drop across the reactance windings 15a and 15b and therefore an increase in the voltage supplied to the lamps. Conversely, a decrease in the current in the control winding results in an increase of the reactive voltage drop across the reactance windings and therefore a decrease in the voltage supplied to the lamps.

Although the electric valve apparatus 16 may be of any suitable type, it is preferably of the type disclosed in U. S. Patent 1,904,485—Livingston. The output circuit of this electric valve apparatus is connected to the conductors 17, which correspond with the conductors 21 and 26a of the Livingston patent.

As shown, the electric valve apparatus 16 is connected to the supply source 13, 14 by means of conductors 18 and 19.

A modern theatre dimming system has a large number of lamp circuits, but since these circuits are identical, only one additional lamp circuit 20 is illustrated in the drawing. The manner in which all the circuits are simultaneously controlled will be clear from the explanation of the manner in which the lamp circuits 10 and 20 are controlled. The lamp circuit 20 is connected to the supply source 13, 14 as indicated and the intensity of illumination of this circuit is similarly controlled by means of a saturable core reactance device 21 under the control of suitable electric valve apparatus 22. The reactance 21 and electric valve apparatus 22 are identical in all respects with the reactance 15 and electric valve apparatus 16.

In order to provide for presetting a plurality of illumination intensities for the lamp circuit 10, a plurality of control devices 23, 24, and 25 are provided, and similarly a plurality of control devices 26, 27, 28 are provided for presetting a plurality of illumination intensities for the lamp circuit 20. As great a number of control devices is provided for each lamp circuit as the number of lighting scenes that it is desired to preset. In some installations, only two preset control devices are provided for each circuit, whereas in other more elaborate installations, a very much larger number of preset control devices is employed. In the drawing, only three control devices are shown in connection with each lamp circuit although, as suggested, a greater or lesser number may be employed.

As shown, the individual preset control devices are induction voltage regulators. For example, the control device 23 comprises a primary winding 23a and a secondary winding 23b and the control devices 24 and 25 likewise have primary windings 24a and 25a respectively, and secondary windings 24b and 25b respectively. The lower terminals of each of the primary windings is connected to the side 13 of the supply source as shown and the upper terminals thereof are respectively connected to busses 29, 30 and 31 which in turn are ultimately connected through conductor 32 to the opposite side of the supply source 14. One terminal of the secondary winding 23b is connected to the side 13 of the supply source and the secondary windings 23b, 24b, and 25b are connected in series relationship with each other and through conductor 33 to the input or grid circuit of the electric valve apparatus 16. The induction voltage regulators 23, 24 and 25 are actually rotary transformers, the secondary windings of which are mounted for rotation with respect to the primary windings. As shown, the secondary windings 23b, 24b and 25b are provided with suitable means illustrated as manually operated knobs for rotating these windings to any desired position with respect to their corresponding primary windings. The voltage induced in the secondary winding of each of these regulators depends upon the position of its axis with respect to the magnetic axis of its corresponding primary winding. As is well understood, when the axis of the primary and secondary windings are parallel to each other the voltage induced in the secondary winding is a maximum and when these axes are at right angles to each other the voltage induced in the secondary is a minimum or zero. The manually operated knobs may be provided with pointers which cooperate with scales calibrated in terms of intensity of illumination of the controlled lamp circuit. The series connections of the secondary windings 23b, 24b and 25b are such that the voltages induced in these windings are additive.

The individual scene preset control devices 26, 27 and 28 are likewise induction voltage regulators, in all respects identical with the voltage regulators 23, 24 and 25 and are connected to the electric valve apparatus 22 and to the remainder of the system in an identical manner. The conductors 13 and 14 and the busses 29, 30 and 31 are shown partially broken to indicate that any desired number of additional lamp circuits and groups of individual preset control devices therefor may be provided.

Scene masters 34, 35 and 36 are provided for simultaneously controlling the illumination of all of the lamp circuits that are illuminated during the corresponding scene. These scene masters serve to vary the voltages applied to the primary windings of the individual voltage regulators which are active during the corresponding scene. Although these scene masters may be of any suitable type, they are illustrated for the sake of simplicity as resistance type potentiometers. The lower terminals of these potentiometers are connected to the side 13 of the supply source while the upper terminals have connections through the conductor 32 to the opposite side 14 of the supply source.

In order to vary the voltages applied to the primary windings of the individual voltage regulators, the potentiometers 34, 35 and 36 are respectively provided with movable contacts 34a, 35a and 36a, which in turn are respectively connected to the busses 29, 30 and 31. These movable contacts are shown in their maximum voltage positions. Since the primary windings of all the individual voltage regulators for scene 1 are connected to bus 29, it will be observed that movement of the contact 34a varies the voltage of the bus 29 and ultimately varies the intensity of the illumination of all the lamp circuits which are active during scene 1. Likewise, movement of the movable contacts 35a and 36a has a similar effect on the scene 2 and scene 3 regulators, respectively, and the lamp circuits controlled thereby.

Suitable scene selector switching means 37 are provided for connecting the upper terminals of the scene masters, i. e., the potentiometers 34, 35 and 36 to the side 14 of the supply source, and suitable scene fading means 38 are provided in the connections between the scene master and the side 14 of the supply source for oppositely varying the voltages supplied to the scene master. For the purpose of simultaneously varying the intensity of the illumination of all the lamp circuits of the system a grand master 39 is provided. Although this grand master may be of any suitable type, it is shown for the purpose of illustration in the simple form of a potentiometer resistance connected across the supply lines 13 and 14. The potentiometer is provided with a sliding contact 39a, the voltage of which varies with its position on the resistance. The contact 39a is shown in the position of maximum voltage.

The scene selector switching mechanism 37 is shown conventionally comprising a row of stationary contacts 37a, 37b, and 37c, and a second row of stationary contacts 37d, 37e, and 37f, together with a row of movable contacts 37g, 37h, and 37i, each of which may be moved into engagement with either of its cooperating stationary contacts. The switching mechanism 37 is preferably of the type which is arranged in such a manner that only two movable contacts may be actuated at any one instant, and in which the two movable contacts which are actuated can only be in engagement with stationary contacts in opposite rows. That is to say, if the movable contact 37g is in contact with stationary contact 37a, movable contact 37h cannot engage stationary contact 37b, but can only engage stationary contact 37e.

Although the scene fading means 38 may be of any suitable type, it is shown simply as a pair of potentiometers 40 and 41. The left-hand terminal of potentiometer 40 and right-hand terminal of potentiometer 41 are connected by means of conductor 42 to the upper side 13 of the supply source, while the opposite terminals are connected to the movable contact 39a of the grand master 39, likewise illustrated as a potentiometer. Potentiometer 40 is provided with a movable contact 40a and similarly potentiometer 41 is provided with a movable contact 41a. These two movable contacts are suitably interlocked, as by means of a mechanical connecting rod 43 so that when one of these contacts is moved, the other must move in the same direction. Since the potentiometers 40 and 41 are oppositely connected across the supply source 13, 14, it is clear that the voltages of the movable contacts 40a and 41a vary oppositely when the contacts are moved in the same direction. That is to say, when the rotation of the contacts is in such a direction as to increase the voltage of the contact 40a the voltage of the contact 41a decreases, and when the contacts are rotated in the opposite direction the voltage of the contact 40a decreases while that of the contact 41a increases. Contact 40a is connected by means of conductor 44 to the row of stationary contacts 37a, 37b and 37c, while the movable contact 41a is connected by means of conductor 45 to the row of stationary contacts 37d, 37e, and 37f.

With the above understanding of the elements and their organization, the operation of the system itself will readily be understood from the following detailed description: With the movable contacts 40a and 41a in the extreme right-hand position in which they are illustrated, the voltage of the conductor 44 will be the voltage of the side 14 of the supply source and the voltage of the conductor 45 will be the voltage of the side 13 of the supply source. In other words, the voltage of the conductor 45 will be zero with respect to the voltage of the side 13 of the supply source and the conductor 44 will have 100% voltage. Assume now, that for the first scene it is desired that the lamps 10 shall be at 75% of full intensity and that during the second scene these lamps shall be at 25% of full intensity. Accordingly the individual voltage regulator 23 for scene 1 is preset for 75% intensity and individual regulator 24 for scene 2 is preset for 25% intensity. In other words, the secondary winding of voltage regulator 23 is rotated by means of its knob and associated scale (not shown) to the 75% intensity position and similarly the secondary winding of voltage regulator 24 is rotated to the 25% intensity position. Thus, when 100% line voltage is applied to the primary windings of voltage regulators 23 and 24, 75% line voltage will be induced in the secondary winding of voltage regulator 23 and 25% of full line voltage will be induced in the secondary winding of voltage regulator 24.

Scene No. 1 is established by moving the movable contact 37g into engagement with the stationary contact 37a thereby applying 100% voltage to the scene master potentiometer 34 and consequently 100% voltage to the bus 29 and the primary windings of scene 1 voltage regulator 23. Movable contact 37h is moved into engagement with stationary contact 37e and since conductor 45 is at zero voltage with respect to the side 13 of the supply source, the voltage drop across scene 2 master potentiometer 35 is zero and consequently zero voltage is applied to the primary windings of scene 2 voltage regulator 24. Movable contact 37i is out of engagement with both of its cooperating stationary contacts and therefore zero voltage is applied to the primary windings of scene 3 voltage regulator 25. Thus, 100% line voltage is applied to the primary windings of voltage regulator 23 and 75% voltage is induced in the secondary winding. This condition is illustrated diagrammatically in the chart of Fig. 2 in which the point 46 represents the primary voltage and the point 47 represents the secondary voltage of the regulator 23. Since the voltage of the secondary windings of regulators 24 and 25 is zero, the 75% line voltage of the secondary winding of voltage regulator 23 is applied to the input circuit of electric valve apparatus 16 and as a result the lamps 10 burn at 75% full intensity. Actually the voltage applied to the input circuit of the electric valve apparatus 16 is less than 75% line voltage due to the IZ drop in the unenergized secondary windings of the voltage regulators 24 and 25. However, since the current required for the electric valve apparatus is small and since the impedance of the secondary windings of the regulators 24 and 25 is relatively constant the actual voltage impressed upon the input circuit of the electric valve apparatus is but a small and inconsequential constant different from the value of the secondary voltage of regulator 23.

When it is desired to effect the transition from scene 1 to scene 2, movable contacts 40a and 41a of the scene fader are rotated in a counterclockwise direction from the extreme right-hand positions in which they are illustrated to their extreme left-hand positions at a desired predetermined speed. At the beginning of this movement the voltage impressed upon the primary winding of scene 2 voltage regulator 24 is zero, which is represented by the point 48 of Fig. 2. As the movement progresses the voltage of the contacts 40a and consequently the voltage impressed upon the primary winding of voltage regulator 23 decreases linearly from 100% to zero as represented by the straight line 49. Likewise the secondary voltage of regulator 23 decreases linearly from 75% to zero as represented by the straight line 50. Simultaneously, the voltage of the movable contact 41a and consequently the voltage impressed upon the primary winding of voltage regulator 24 increases linearly from zero to 100% as represented by the straight line 51, and since the secondary winding of voltage regulator 24 is preset for a maximum voltage of 25% the secondary voltage of regulator 24 increases linearly from zero to 25%, as represented by the straight line 52.

Due to the series connection of the secondary windings of the individual voltage regulator, the actual voltage impressed upon the grid circuit of the electric valve apparatus 16 at any instant during this transition is the sum of the voltages of the secondary winding of voltage regulators 23 and 24. In other words, the voltage impressed upon the grid circuit of the electric valve apparatus is the sum of the voltages represented by the lines 50 and 52, which sum in turn is represented by the straight line 53.

Thus it will be observed that a gradual linear transition has been effected from the intensity of illumination of scene 1 to the preset intensity of illumination of scene 2. Rotation of the movable contacts 40a and 41a of the scene faders in the reverse direction will effect a linear transition from scene 2 to scene 1. To effect the transition from scene 2 to scene 3 the movable contact 37g is disengaged from its cooperating stationary contact and the movable contact 37i is moved into engagement with cooperating stationary contact 37c. Thereafter rotation of the movable contacts 40a and 41a from one extreme position to the other effects the gradual linear transition to the next scene in the previously explained manner.

Although in accordance with the provisions of the patent statutes this invention is described as embodied in concrete form it will be understood that the invention is not limited to the specific apparatus and connections shown, that alterations and modifications will readily suggest themselves to persons skilled in the art without departing from the true spirit of this invention or the scope of the annexed claims.

What we claim as new and desire to secure by Letters Patent of the United States is:

1. A control system comprising a device to be controlled, means for presetting a plurality of operating values for an electrical condition of said circuit comprising a plurality of voltage regulators each having a plurality of inductively related windings, said regulators having a corresponding winding of each connected in series relationship with each other, means for supplying a voltage to other corresponding windings of said regulators, and means for oppositely varying the voltages supplied to two of said regulators.

2. A control system for dimming apparatus and the like comprising a lamp circuit, means for presetting a plurality of illumination intensities for said circuit comprising a plurality of voltage regulators each having a pair of inductively related windings, means for supplying a voltage to one winding of each of said regulators the other windings of said regulators being connected in series relationship and means for oppositely varying the voltages supplied to two of said regulators thereby to provide linear variation of the intensity of illumination from one preset value to another.

3. A control system comprising a controlled device, means for presetting a plurality of operating values of an electrical condition of said device comprising a plurality of induction voltage regulators each having a primary and a secondary winding, said secondary windings being connected in series relationship with each other, means for selectively connecting the primary windings of two of said regulators to a source of voltage, and means for oppositely varying the voltages supplied to said two regulators thereby to obtain gradual linear transition from one of said operating values to another.

4. A control system for dimming apparatus and the like comprising a lamp circuit, means for presetting a plurality of intensities of illumination for said circuit for a plurality of scenes comprising a plurality of voltage regulators, one for each scene, and each having inductively related primary and secondary windings, said secondary windings being connected in series relationship with each other, scene selection switching means for connecting the primary windings of any two of said regulators to a supply source, and scene fading means for oppositely varying the voltages supplied to the primary windings of said regulators to provide gradual linear transition from each intensity of illumination preset for one scene to the intensity preset for another scene.

5. A control system comprising in combination a controlled circuit, means for controlling an electrical condition of said circuit, a plurality of voltage regulators for presetting a plurality of operating values of said circuit condition, each of said regulators having a pair of inductively related windings, a winding of each of said regulators being connected in series relationship with corresponding windings of the remaining regulators to said control means, means for selectively connecting the remaining windings of any two of said regulators to a source of voltage and means for oppositely varying the voltages supplied to said regulators.

6. A control system comprising in combination a controlled circuit, means for controlling an electrical condition of said circuit, means for presetting a plurality of operating values of said circuit condition comprising a plurality of induction voltage regulators having their secondary windings connected to said control means in series relationship with each other, means for selectively connecting the primary windings of any two of said regulators to a source of voltage and means for effecting a gradual linear transition of said electrical condition from one preset value to another comprising means for simultaneously and oppositely varying the voltages supplied to said regulators connected to said source.

7. An illumination control system for dimming apparatus and the like comprising a lamp circuit, means for controlling the intensity of illumination of said circuit, means for presetting a plurality of illumination intensities for said circuit comprising a plurality of induction voltage regulators having their secondary windings connected to said control means in series relationship with each other, scene switching means for selectively connecting the primary windings of two of said regulators to a voltage supply source, and scene fading means for varying the voltage supplied to one of said regulators from a maximum value to a substantially lower minimum value and simultaneously varying the voltage supplied to another of said regulators from a minimum to a maximum value thereby to effect gradual linear transition from one preset intensity of illumination to another.

8. A control system comprising a controlled circuit, electric valve apparatus for controlling an electrical condition of said circuit, means for presetting a plurality of operating values of said electrical condition comprising a plurality of individual induction voltage regulators having their secondary windings connected to control said valve apparatus in series relationship with each other, means for connecting the primary windings of said regulators to a voltage supply source, and means for oppositely varying the voltages supplied to the primary windings of two of said regulators between predetermined maximum and minimum values thereby controlling said valve apparatus to effect transition of said electrical condition from one preset value to another.

9. An illumination control system for dimming apparatus and the like comprising a lamp circuit, means for controlling the intensity of illumination of said circuit comprising a saturable core type reactor provided with a control winding, means for controlling said reactor comprising electric valve apparatus connected to said control winding and provided with a control grid, means for presetting a plurality of illumination intensities for said circuit comprising a plurality of induction voltage regulators having their secondary windings connected in series relationship to said grid, scene selector switching means for selectively connecting the primary windings of any two of said regulators to a voltage supply source and a scene fading device for oppositely varying the voltages supplied to said primary windings between predetermined maximum and minimum values thereby to effect gradual linear transition of illumination from one preset intensity to another.

DUDLEY E. CHAMBERS.
ELBERT D. SCHNEIDER.